(12) United States Patent
Hewitt

(10) Patent No.: US 7,051,999 B2
(45) Date of Patent: May 30, 2006

(54) APPARATUS FOR FISHING TELECOMMUNICATION OR ELECTRICAL WIRES, OPTICAL CABLES OR CONDUIT BEHIND WALLS

(76) Inventor: Todd R. Hewitt, 5 Bassette La., Mine Hill, NJ (US) 07803

( * ) Notice: Subject to any disclaimer, the term of this patent is extended or adjusted under 35 U.S.C. 154(b) by 0 days.

(21) Appl. No.: 10/370,263

(22) Filed: Feb. 21, 2003

(65) Prior Publication Data
US 2004/0164283 A1 Aug. 26, 2004

(51) Int. Cl.
*E21C 29/16* (2006.01)

(52) U.S. Cl. .................. 254/134.3 R; 254/134.3 FT
(58) Field of Classification Search ........ 254/134.3 FT, 254/134.3 R; 294/65.5; 335/306, 207; 166/65; 29/241
See application file for complete search history.

(56) References Cited

U.S. PATENT DOCUMENTS

| | | |
|---|---|---|
| 1,130,775 A | 3/1915 | Toffey |
| 2,923,528 A | 2/1960 | Komorski |
| 3,078,073 A | 2/1963 | Zizzo |
| 3,924,115 A | 12/1975 | Hampton et al. |
| 3,971,543 A | 7/1976 | Shanahan |
| 4,527,775 A | 7/1985 | Flowers |
| 4,572,561 A | 2/1986 | Hale |
| 4,573,829 A | 3/1986 | Keene et al. |
| 4,618,124 A | 10/1986 | Flowers |
| 4,768,911 A | 9/1988 | Balter |
| 5,261,714 A | 11/1993 | Slusar et al. |
| 5,440,297 A | 8/1995 | Bright |
| 5,522,630 A | 6/1996 | James |
| 5,988,109 A | 11/1999 | Rofen |
| 6,257,808 B1 | 7/2001 | Groot |
| 6,348,104 B1 | 2/2002 | Bakker |

*Primary Examiner*—Robert C. Watson
(74) *Attorney, Agent, or Firm*—Ernest D. Buff & Associates; Ernest D. Buff; Margaret A. La Croix

(57) ABSTRACT

An apparatus fish's telecommunication or electrical wiring, optical cables or conduit behind walls without need for a plurality of drilled holes or cutting slots. The apparatus has a central drive shaft comprising a magnetic mouse; a string; and a permanent magnet. The magnetic mouse comprises a sheet cut from a soft magnetic sheet material, coated with a low friction surface finish. It is attached to the string and dropped through a first hole location in the wall into a common bay between joists behind the wall. Following insertion, the magnetic mouse is driven from the first hole location to a second hole location by a permanent magnet, which is translated over the ceiling or interior of the wall. Translation of the permanent magnet moves the magnetic mouse inside the ceiling or wall, carrying the string through the common bay from said second hole location to said first hole location, thereby establishing a fishing line. The permanent magnet is, optionally, covered with felt to prevent scratching of the wall. A telecommunication or electrical wire; or optical cable; or conduit is attached to said fishing line, causing it to be pulled through the common bay from said second hole location to said first hole location.

20 Claims, 2 Drawing Sheets

APPARATUS FOR FISHING TELECOMMUNICATION OR ELECTRICAL WIRES, OPTICAL CABLES OR CONDUIT BEHIND WALLS

BACKGROUND OF THE INVENTION

1. Field of the Invention

The present invention relates to installation of conduit within confined spaces behind walls of commercial or residential buildings; and more particularly to a method and means for stringing up new or additional telecommunication wires, optical cables or electrical wiring behind sheetrock or plaster walls in existing homes or office buildings, without having to open out or cut pathways for the wire.

2. Description of the Prior Art

Those responsible for construction and maintenance of homes and commercial buildings have long struggled to devise a method and means for addressing the difficult task of bringing in new wires for electrical service. They are also tasked with the charter of providing high-speed Internet capability using telecommunication wires or optical cables without having to tear up existing walls and ceilings. Generally, installation includes tearing up of progressive slots or holes in the ceiling or walls to enable the telecommunication, optical or electrical wiring to be drawn from one inlet location to a second outlet location. After the installation work is complete, the sheetrock or plaster must be resurfaced to obtain a suitable finish for repainting. This string-up process is wasteful, consuming time, energy and expense.

U.S. Pat. No. 1,130,775 to I. J. Hi Toffey discloses a wire finding and coupling device. The device comprises a projectile shaped body having three spring-loaded wing arms, which flex so that a fishing cable can be freely inserted into a conduit. After the projectile goes around a bend in the conduit, it can be snagged using a hook and threaded into the conduit. The Toffey device is a wire finding and coupling device that sends a wire through a conduit in spite of bends in the conduit. The wire moves readily into the conduit and can be fished using a snagging hook. For operation, the device requires the presence of a pre-drawn conduit behind the walls. Accordingly, the device does not thread a telecommunication or electrical wire within a free space extant between building structure and the back of a sheetrock or plaster wall.

U.S. Pat. No. 2,923,528 to W. A. Komorski discloses an electrician's fishing tool. The electrician's fishing tool consists of a wire that is fabricated from three strands of oppositely wound wire. With this construction, the wire elongates minimally upon application of a load thereto; it transmits twisting motion across the long wire due to the opposite windings. One end of the braided wire is anchored to an ordinary wire using a clamp formed by producing a fork. The fork clamps the braided wire, transmitting twist motion. Such an arrangement facilitates snaking of braided wire through bends in a conduit, which may have many bends, is occasionally pinched, and may have a few nails extending therethrough. Like Toffey, Komorski's requires the presence of a pre-drawn conduit behind the walls. Accordingly, the Komorski device does not thread a telecommunication or electrical wire within a free space extant between building structure and the back of a sheetrock or plaster wall.

U.S. Pat. No. 3,078,073 to T. J. Zizzo discloses an electrical wire finder. The electrical wire is attached to a conductor holder with a screwed fastener and inserted through a wall opening for an electrical outlet. The top portion of the conductor holder carries a powerful permanent magnet. A flexible string is attached to a sensor made from magnetizable material, such as steel, and is lowered from the attic in the same bay. When the sensor element comes in close proximity with the permanent magnet, it is attracted and is held securely by the permanent magnet. Pulling on the flexible string then drags the wire functioning as a wire stringing apparatus. If excessive force is used during pulling of the string, or if the electrical wire offers excessive resistance, the magnet may let go, breaking the guided pull. Operational reliability thus presupposes lack of resistance of the wire to the pulling process, which is oftentimes not present during all installation conditions.

U.S. Pat. No. 3,971,543 to Shanahan discloses a tool and kit for electrical fishing. A magnetically attractable body is hung on a chain formed from spherical elements connected by studs; and the structure is hung on a string from an eyelet. The chain can swing readily to contact a magnet. A magnet body is inserted at the wall receptacle and carries the magnet. When the spherical element is attracted to the magnet, it is audible and can be pulled down to have a continuous string from the starting point to the end point. A wire can be pulled through when it is attached to the string, which facilitates threading of an electrical wire. The swinging ability of spherical element reduces the need to aim the magnetizable element very close to the magnet. These additional elements increase the cost and decrease reliability of the Shanahan device. The magnetically attractable element of the Shanahan device is not guided by a magnet; but is captured by a magnet inserted inside the wall.

U.S. Pat. Nos. 4,527,775 and 4,618,124 to Flowers disclose an apparatus for installing a conduit. A tape with a magnetically attractable roller is first inserted through an opening in an attic. The tape is guided to its destination behind a wall, using an electromagnet mounted on wheels, which rides on the interior wall. The electromagnet attracts the roller carrying the tape and guides it downward to its destination as the electromagnet is moved. Once the tape is brought through, the conduit is firmly attached to the tape and is pulled through behind the wall. The Flowers device is an apparatus for installing conduits in pre-existing buildings behind the sheetrock in a wall. The reduced friction of the roller at the end of the tape allows free rolling of the rollers on the inner surface of the wall, and it is guided to its destination by the electromagnet on rollers riding on the interior wall. The electromagnet in the Flowers device does not contact the interior wall, since it is riding on the rollers. As a result, the distance between the magnet and the attracted magnetizable body within the interior of the walls is larger than the thickness of sheetrock. In addition, the electromagnet is generally weak, especially at increased distance between the electromagnet and the magnetizable body, and consumes battery power resulting in reduced battery service life. The distance between the electromagnet and the magnetizable body is lowest when each is aligned in the same vertical plane; and any departure of these two elements increases their relative distance, resulting in even weaker attraction. Accordingly, the tape-carrying roller tends to lose contact with the inner wall and wander, resulting in unreliable string-up attempts.

U.S. Pat. No. 4,572,561 to Hale discloses a tool for magnetically locating and recovering electrical wires. A magnet is attached to the end of a wire being fished. Another magnet is surrounded by cork or wood, so that it is buoyancy neutral when suspended in a liquid. When the magnet suspended in a buoyant liquid is brought close to the interior wall, the floating magnet indicates the lateral position of the end of the wire with the attached magnet is located within the sheetrock or plaster wall. Once the position of the end of the wire is known, it is easy to drill a hole to fish the wire through. This procedure only locates the wire; it does not guide the wire from one point to another point. Accordingly, the method disclosed by Hale requires cutting or drilling holes in-between the two points.

U.S. Pat. No. 5,261,714 to Slusar et al. discloses an electromagnetic pick-up tool. This tool uses an elongated flexible tubular conductive shaft, which carries an electromagnet on one end. Batteries on the other end power the electromagnet. The flexible shaft is inserted to retrieve magnetizable objects. No disclosure is contained in Slusar et al. concerning a string up device for inserting electrical wires behind a sheetrock wall.

U.S. Pat. No. 5,440,297 to Bright discloses an electrician's fish tape locator system. The fish tape locator system comprises a transmitter assembly and a receiver to determine when the fish tape that is forced through the conduit has reached a terminus. The transmitter assembly is mounted at the conduit terminus and the fish tape is inserted from the other end, where the electrician is forcing the fish tape. The end of the fish tape activates a contact switch and the transmitter. A receiver in close proximity to the electrician receives the transmitted signal, activating an audio indication. Bright's device aids the electrician by determining when to stop pushing the fish tape through a conduit. It does not assist with pushing electrical wire behind a sheetrock wall, when no conduit is present.

U.S. Pat. No. 5,522,630 to James discloses a fishing tool for magnetic objects. The tool consists of an electromagnet powered by a variable power DC battery source. In one embodiment, an electromagnet is attached to a string using an eyelet formed on the electromagnet. The assembly is lowered from an upper hole into a bay between joists disposed behind a sheetrock or plaster wall. A magnetizable fish tape is inserted in a lower hole in the same bay, and the electromagnet is energized using the variable DC power supply. The electromagnet attached to the string attracts and captures the fish tape. Each of the fish tape and the electromagnet is pulled through the lower hole, completing the string up operation. In a second embodiment, the fish tape is secured to a slot in the fishing tool, and is held by screws. The fishing tool, with the attached fish tape, is pushed up through the conduit from the lower hole and energized by the variable power DC source. A magnetizable fishing tape is inserted from the top to contact the energized fishing tool and capture it. The fishing tape together with the fishing tool is pulled through the upper hole. This attraction completes the fishing operation and the wire can be pulled through. In both cases, a tool is energized by a variable power electromagnet attracting a magnetizable article inserted at the upper hole or lower hole and relies on a secure attachment between the energized electromagnet and magnetizable fish to complete the fishing operation. Since the electromagnet used in the first embodiment is heavy and carried by a flexible string, it can swing and may not easily contact the inserted fish tape at the lower hole, especially if the upper and lower holes are not aligned in a vertical plane. In the second embodiment, the heavy electromagnet is essentially carried by the fish tape, attached by screws in an asymmetric configuration, and has to carry the electrical leads. This configuration allows bending and collapse of the fish tape. It may not be inserted vertically, thereby impairing its ability to contact the inserted magnetizable fish tape at the upper hole. With either embodiment, the magnetizable object and the electromagnet must be in close proximity to create contact. In addition, the electromagnet must sustain the weight of the electromagnet and fish tape during pull. Such sustained contact is oftentimes not readily accomplished, and requires a high current that is not easily provided by a battery power source.

U.S. Pat. No. 6,257,808 to Groot discloses a wall fishing apparatus. It uses a long flexible shaft and work engaging means to insert a drill bit on the distal end of the flexible shaft. The other end of the flexible shaft is connected to a hand drill. The device is designed to drill holes in inaccessible cross members, which essentially obstruct the ability to pass a conduit or wire through the wall behind the sheetrock. A threading means for passing wire or conduit through the drilled hole is disclosed. This actively clears the way for inserting a wire or conduit through behind a sheetrock or plaster wall, but does not provide the functionality of stringing up a telecommunication or electrical wire.

There remains a need in the art for an effective apparatus for fishing telecommunication wires, optical cables or electrical wiring through a bay between joists behind a sheetrock or plaster wall without having to drill multiple holes or create slots along the Wire path. Such drilling and cutting operations mar the appearance of the wall and require a refinishing operations wherein plaster is reapplied to regain an appropriate wall substrate appearance and the wall is thereafter repainted or wall papered. Such refinishing operations are time consuming and expensive.

SUMMARY OF THE INVENTION

The present invention provides a cost effective method and means for fishing telecommunication or electrical wiring within an unobstructed single bay containing joists behind a sheetrock or plaster wall, without having to drill multiple holes or cut several slots for the string-up operation. Apparatus of the invention is easy to use and reliable in operation. As such, it is especially well suited for use by building contractors as well as owners of residential dwellings.

Generally stated, there is provided an apparatus for fishing telecommunication and electrical wires and optical cables behind plaster or sheetrock walls. The apparatus has three elements, comprising: (i) a magnetic mouse made from a soft magnetic sheet approximately 3 mm thick and approximately 50 mm long×12 mm wide, which travels behind the sheetrock or plaster wall in a single bay attached to a string; (ii) a high energy product permanent magnet adapted for movement on the interior wall, which drives the magnetic mouse behind the sheetrock or plaster wall within the single bay, to thereby maintain strong attraction with the magnet; and (iii) a string attached to the magnetic mouse, creating a connection line between point A to point B, so that a wire, cable or conduit attached to the string can be pulled up through the fished line to complete the electrical, optical or conduit pathway between points A and B. A low friction coating such as a Teflon™ coating is applied to the magnetic mouse. The low friction coating allows the magnetic mouse to follow the movement of the magnet easily, due to reduced frictional forces. In another embodiment, the magnetic mouse 3 is coated with paint to prevent it from rusting. Generally, the permanent magnet is of the NdFeB type, which is a high-energy product magnet, having an energy product over 40 mega-gauss oerstead and is not subject to self-demagnetization. It has a strong magnetic attractive force and attracts the magnetic mouse in the 6 to 16 mm range effectively and is capable of driving the magnetic mouse behind the wall as the permanent magnet is moved on the interior surface of the wall. The permanent magnet is covered with a felt pad to prevent damage to the finish of the walls by scratching as the permanent magnet is moved from point A to point B. Preferably, the string is fabricated from natural or synthetic materials; or flexible mono-filament yarn; or multi-filament twisted flexible fine wire.

When the fishing operation is complete, the magnetic mouse fabricated from soft magnetic steel is separated from the permanent magnet, causing it to be no longer magnetized.

BRIEF DESCRIPTION OF DRAWINGS

The invention will be more fully understood and further advantages will become apparent when reference is had to the following detailed description and the accompanying drawings, in which.

DESCRIPTION OF THE PREFERRED EMBODIMENTS

Figure 1:
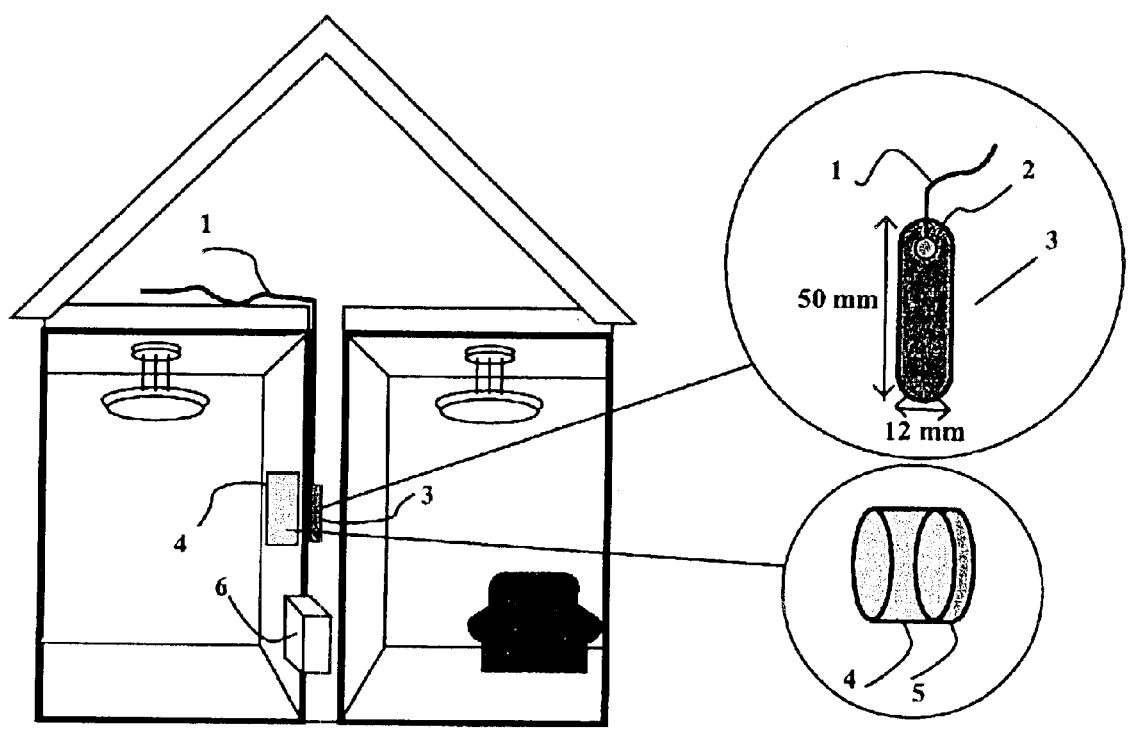
FIG. 1 is a schematic diagram illustrating the apparatus engaged in string-up of telecommunication wires, optical cables or electrical wiring, the apparatus elements shown comprising a magnetic mouse, a high energy product magnet and a string.

Adding additional wiring within pre-existing buildings is frequently necessary. Such additional wiring is generally required to create new outlets in a room, or to install telecommunication lines such as high-speed Internet connections or optical network connections. During installation of such wiring it is necessary to create pathways behind pre-existing walls. Installation of these connections usually requires drilling holes or cutting slots within the sheetrock or plaster walls or ceilings in order to string the wiring. It is often more difficult to run connections through a ceiling since gravity does not assist following a given track. Consequently, devices previously employed by prior art workers have heretofore been unable to successfully string-up a connection without drilling a plurality of cutting holes through the ceiling.

The present invention provides a low cost reliable apparatus comprising a magnetic mouse comprising a soft magnetic body, typically steel, coated with a low friction coating and attached to string. The magnetic mouse is inserted into a confined space between the building exterior and a sheet rock wall. Insertion proceeds from at a starting location, which is generally a first hole in a common unobstructed vertical bay or a ceiling bay between joists. During insertion, the spring is maintained outside the hole. The magnetic mouse attached to the string is guided through the bay using a high-energy product magnet placed on the interior surface of a ceiling or wall. The magnetic mouse attached to the string follows the motion of the high-energy product and is essentially walked from the first hole to a second hole, which is connected to the same bay. When the magnetic mouse reaches the second hole, it is pulled through the second hole, whereupon it instantly attaches to the permanent magnet. The fished string from point A to Point B is then available for attaching a wire or cable. A cable or wire is pulled through from point B to point A by pulling the string at point A. The string is selected, so that it is flexible yet has sufficient strength to pull the wire or cable though without breakage. Typically the string is composed of natural or synthetic materials, mono-filament-fishing lines, multiply stranded multi-filament high strength flexible wires, and the like. Using this apparatus, a conduit that is quite heavy may also be pulled from point B to point A.

The invention specifically relates to an apparatus for stringing up telecommunication wires, optical cables or electrical wiring behind walls of the subject invention, which consists of a magnetic mouse, attached to a string and a permanent magnet. Specifically, the magnetic mouse uniquely enables a single worker to move a telecommunication wire, optical cable or electrical wire from point A to point B, including wire runs along a ceiling behind the sheetrock or plaster. There are several tools that have been designed to perform the function of snaking a wire between two points along a vertical wall. These tools cannot perform the function of drawing a wire or a cable along a ceiling joist bay and can only be used with two or more persons. The magnetic mouse uses a permanent magnet on the outside of a sheetrock wall to direct a piece of metal that is located inside the wall attached to a string. Advantageously, the magnetic mouse enables the user to direct the magnetic mouse attached to a string to any selected location on the wall, causing the wiring task to proceed quickly, in an efficient, accurate and economical manner. Use of high-energy product permanent magnet instead of an electromagnet, obviates the need for battery power. A further advantage of the magnetic mouse resides in its ability to perform the locating function without having to cut a large hole in the wall. All that is required is a 16 mm×16 mm hole, sufficient to insert the magnetic mouse. With the magnet on the outside of the wall, the user knows precisely where the magnetic mouse is behind the wall within the joist. For this reason, a much smaller hole can be cut. A piece of felt disposed on one side of the magnet protects the wall from any scratches that the magnet would otherwise make. The magnetic mouse makes those installation tasks easy and clean that might otherwise be hard and messy.

Referring to FIG. 1, there is illustrated a schematic diagram of the string up procedure for an electrical wire using the apparatus for stringing up telecommunication or electrical wires, optical cables or conduit behind sheetrock or plaster walls. A string 1 together with the magnetic mouse 3 is lowered from the attic between the walls in a common bay towards an outlet opening 6. The string is of sufficient length that some string is always available at the entrance hole as the magnetic mouse is moved within the bay between joists. The motion of magnetic mouse 3 is guided by permanent magnet 4 with a felt pad 5 attached to it. The magnet is moved on the interior wall surface as shown by FIG. 1. This strong permanent magnet 4 is composed of a NdFeB magnetic alloy, which has a high-energy product of over 40 mega gauss oerstead, and excellent magnetic ability so as to attract steel pieces, such as the magnetic mouse, over a large distance. Due to its high energy product, the permanent magnet does not demagnetize easily, and provides a long service life for the apparatus. FIG. 1 also shows detailed views of the magnetic mouse and the permanent magnet. A string 1 is attached to the magnetic mouse 3, and bonded by glue at location 2. Alternatively, the string 1 can be pinched, crimped or otherwise secured to the magnetic mouse 3. The mouse 3 is typically fabricated from 18-gauge cold rolled steel, which is readily attracted by a magnet. Mouse 3 is approximately 50 millimeters long and twelve millimeters wide. Semicircular ends add 12 millimeters to the length of the parallel portion, as shown by FIG. 1. The thickness of the magnetic mouse is typically of the order of 3 millimeters. The magnet used to attract the mouse is shown at 4 in the detailed view. The bottom surface of the magnet, in contact with the interior wall surface, is cushioned with a felt pad 5 to protect the wall from scratches when the magnet is moved over the sheetrock wall to articulate the mouse. All edges of the magnetic mouse steel sheet are ground smooth, so that it glides easily through the spaces behind the sheetrock wall. Optionally, the magnetic mouse may be coated with a low friction material such as Teflon™ to promote easy gliding of the magnetic mouse in the bay between joists. It can also be painted, to provide rust resistance.

After the string is passed through from the attic (point A) to the outlet box 6 (point B), the telecommunication; or electrical wire; or cable; or conduit is attached to the string and pulled through.

Figure 2:
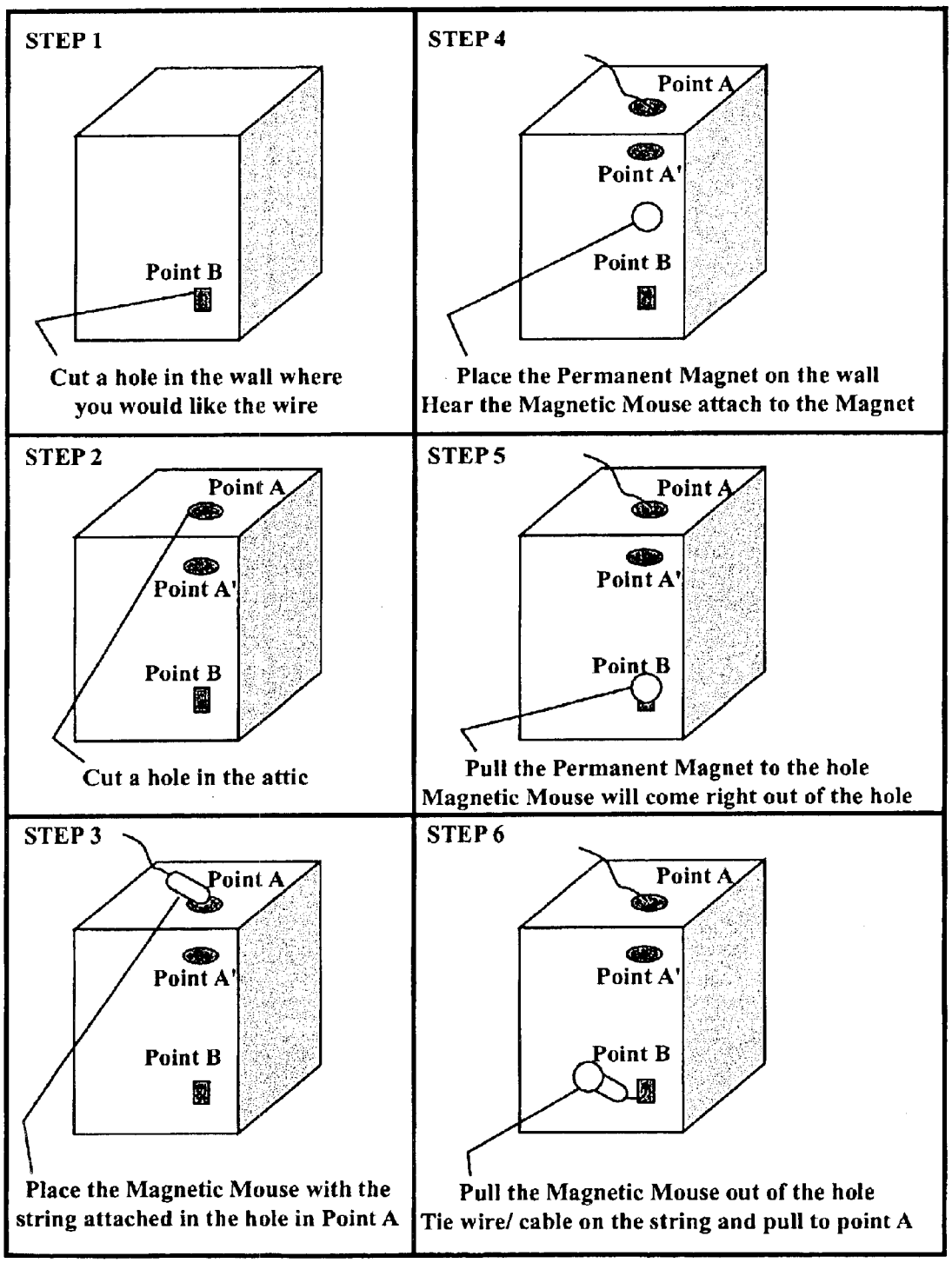
FIG. 2 is a schematic diagram depicting use of the apparatus when snaking a wire or cable from point A to point B, the snaking operation comprising the six steps detailed by the drawing.

In FIG. 2 there is illustrated detailed step-by-step instructions for use of magnetic mouse 3. A fishing line is extended from attic position A to a wall plate position B, or alternatively, from position A' connoting a wall location to position B connoting another wall location in the same bay. The magnetic mouse is a tool used for string-up of telecommunication wire, optical cables or electrical wiring through existing walls without having to cut holes in the walls during the string-up operation. It enables the user to snake a wire down a wall or along a ceiling line with less trouble then is encountered with use of a traditional snake. The magnetic mouse consists of three parts: (i) a mouse, (ii) a magnet; and (iii) a string. Each of these parts is shown in detail in FIGS. 1 and 2. Use procedures for the magnetic mouse are set forth below:

Step 1. Cut hole in wall at point B

Step 2. Drill hole in plate of the wall (point A') or attic (point A), making sure that it is in the same bay as the hole cut in the wall. This assures that there are no wooden structural cross pieces in the way, since the magnetic mouse cannot cross a wooden piece and requires a free and clear path.

Step 3. Insert mouse in the hole drilled at point A or point A' about 50 mm by 50 mm. Place permanent magnet on wall Step 4. Move permanent magnet around on the wall until a sound connotes that the magnetic mouse is attached to the permanent magnet Step 5. Pull the permanent magnet to the hole at point B slowly restricting the motion within one bay between joists.

Step 6. Upon coming to the hole at point B, stop for an instant; then go over the hole very slowly. Pull magnet away from hole at point B. Take the magnetic mouse off of the permanent magnet. Cut the string off the mouse. Tie the telecommunication or electrical wire or optical cable or conduit to an end of the string. Pull string and the wire, cable or conduit will come out at the desired location.

The magnetic mouse can only go down one bay in the wall. It cannot go across the wall without notching of the beams. In addition, the procedure is especially suited for sheetrock, or plaster walls. Due to the attraction properties of the high-energy product strong permanent magnet, sheetrock used in the wall construction should have a maximum thickness of 16 millimeters. If the sheetrock or plaster thickness is in the range of 6 mm to 16 mm the mouse is most effectively driven by the motion of the permanent magnet on the interior surface of the wall. Beyond sheetrock or plaster thickness of 16 mm, the attraction between the mouse and the permanent magnet decreases sufficiently to uncouple the mouse from the magnet motion, causing the mouse to separate and fall down or dangle on the string in between the joists in a bay. Typically, a sheetrock wall is about 12 millimeters thick. Accordingly, the magnetic mouse is well suited for use with most sheetrock walls to accomplish installation of telecommunication or electrical wiring without having to drill multiple holes or cut several slots for the string-up operation.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. An apparatus for fishing telecommunication or electrical wiring, optical cables or conduit behind walls without need for a plurality of drilled holes or cutting slots therein, comprising:
   a. a magnetic mouse composed of a soft magnetic alloy for insertion through a first hole location in said wall into a common bay between joists behind said wall, the magnetic mouse being coated with a low friction coating;
   b. a string attached to said magnetic mouse for providing a fishing line;
   c. a permanent magnet located on an interior surface of said wall for translation thereon to attract, capture and move said magnetic mouse from said first hole location to a second hole location to establish said fishing line; and
   d. a telecommunication or electrical wire or optical cable or conduit attached to said fishing line, whereby said fishing line is pulled through said common bay from said second hole location to said first hole location.

2. An apparatus as recited by claim 1, wherein said low friction coating is composed of Teflon™.

3. An apparatus as recited by claim 1, wherein said magnetic mouse has a thickness of about 3 mm.

4. An apparatus as recited by claim 1, wherein said magnetic mouse has a length of about 50 mm and a width of about 12 mm.

5. An apparatus as recited by claim 1, wherein said string is composed of synthetic material.

6. An apparatus as recited by claim 1, wherein said string is a flexible mono-filament yarn.

7. An apparatus as recited by claim 1, wherein said string is a multi-filament twisted flexible fine wire.

8. An apparatus as recited by claim 1, wherein said permanent magnet is composed of a NdFeB alloy.

9. An apparatus as recited by claim 1, wherein said permanent magnet comprises a felt pad adapted to contact said wall and prevent scratching of the wall's surface finish.

10. An apparatus as recited by claim 1, wherein said string is composed of a natural material.

11. An apparatus for fishing telecommunication or electrical wiring, optical cables or conduit behind walls without need for a plurality of drilled holes or cutting slots therein, comprising:
    a. a magnetic mouse composed of a soft magnetic alloy for insertion through a first hole location in said wall into a common bay between joists behind said wall;
    b. a string attached to said magnetic mouse for providing a fishing line;
    c. a permanent magnet located on an interior surface of said wall for translation thereon to attract, capture and move said magnetic mouse from said first hole location to a second hole location to establish said fishing line, said permanent magnet comprising a felt pad adapted to contact said wall and prevent scratching of the wall's surface finish; and d. a telecommunication or electrical wire or optical cable or conduit attached to said fishing line, whereby said fishing line is pulled through said common bay from said second hole location to said first hole location.

12. An apparatus as recited by claim 11, wherein said magnetic mouse is coated with a low friction coating.

13. An apparatus as recited by claim 12, wherein said low friction coating is composed of Teflon™.

14. An apparatus as recited by claim 11, wherein said magnetic mouse has a thickness of about 3 mm.

15. An apparatus as recited by claim 11, wherein said magnetic mouse has a length of about 50 mm and a width of about 12 mm.

16. An apparatus as recited by claim 11, wherein said string is composed of synthetic material.

17. An apparatus as recited by claim 11, wherein said string is a flexible mono-filament yarn.

18. An apparatus as recited by claim 11, wherein said string is a multi-filament twisted flexible fine wire.

19. An apparatus as recited by claim 11, wherein said permanent magnet is composed of a NdFeB alloy.

20. An apparatus as recited by claim 11, wherein said string is composed of a natural material.

* * * * *